United States Patent
Nomiyama et al.

(10) Patent No.: US 12,497,562 B2
(45) Date of Patent: Dec. 16, 2025

(54) BETA-SIALON PHOSPHOR PARTICLE AND LIGHT EMITTING DEVICE

(71) Applicant: DENKA COMPANY LIMITED, Tokyo (JP)

(72) Inventors: Tomohiro Nomiyama, Tokyo (JP); Manabu Kobayashi, Tokyo (JP); Masaru Miyazaki, Tokyo (JP); Tatsuya Okuzono, Tokyo (JP)

(73) Assignee: DENKA COMPANY LIMITED, Tokyo (JP)

( * ) Notice: Subject to any disclaimer, the term of this patent is extended or adjusted under 35 U.S.C. 154(b) by 970 days.

(21) Appl. No.: 17/636,169

(22) PCT Filed: Aug. 14, 2020

(86) PCT No.: PCT/JP2020/030892
§ 371 (c)(1),
(2) Date: Jul. 15, 2022

(87) PCT Pub. No.: WO2021/033645
PCT Pub. Date: Feb. 25, 2021

(65) Prior Publication Data
US 2022/0356396 A1    Nov. 10, 2022

(30) Foreign Application Priority Data

Aug. 20, 2019   (JP) ................................ 2019-150280

(51) Int. Cl.
*C09K 11/77* (2006.01)
*C09K 11/57* (2006.01)
(Continued)

(52) U.S. Cl.
CPC .......... *C09K 11/7734* (2013.01); *C09K 11/57* (2013.01); *H10H 20/851* (2025.01); *H10K 50/125* (2023.02)

(58) Field of Classification Search
CPC ........ C09K 11/77348; C09K 11/77347; C09K 11/77067; C09K 11/77068; C09K 11/57; (Continued)

(56) References Cited

U.S. PATENT DOCUMENTS

| 8,303,847 B2 | 11/2012 | Gotoh et al. |
| 9,139,769 B2 | 9/2015 | Emoto et al. |

(Continued)

FOREIGN PATENT DOCUMENTS

| CN | 101522859 A | 9/2009 |
| JP | 2013-173868 A | 9/2013 |

(Continued)

OTHER PUBLICATIONS

Oct. 20, 2020 Search Report issued in International Patent Application No. PCT/JP2020/030892.

(Continued)

*Primary Examiner* — Matthew E. Hoban
*Assistant Examiner* — Lynne Edmondson
(74) *Attorney, Agent, or Firm* — Oliff PLC

(57) ABSTRACT

A europium-doped β-sialon phosphor particle. When the element concentration of a Si atom on the surface portion of the particle that is obtained by analyzing a cross section of the phosphor particle by the energy dispersive X-ray analysis method is indicated by Ps [at %], and the element concentration of a Si atom near the center of the particle that is obtained by an analysis by the same method is indicated by Pc [at %], the Pc-Ps value is 3 at % or more.

7 Claims, 1 Drawing Sheet

(51) Int. Cl.
*C09K 11/61* (2006.01)
*H10H 20/851* (2025.01)
*H10K 50/125* (2023.01)

(58) Field of Classification Search
CPC . C09K 11/0833; C09K 11/616; C09K 11/617; H10K 50/125; H10H 29/8512; H10H 29/8513; H10H 20/8512; H10H 20/8513
See application file for complete search history.

(56) References Cited

U.S. PATENT DOCUMENTS

| | | | |
|---|---|---|---|
| 10,093,855 B2 | 10/2018 | Aoyagi et al. | |
| 10,190,044 B2 | 1/2019 | Hosokawa et al. | |
| 10,266,768 B2 | 4/2019 | Emoto et al. | |
| 10,385,267 B2 | 8/2019 | Morikawa et al. | |
| 12,264,274 B2 * | 4/2025 | Nomiyama | C09K 11/617 |
| 2010/0001631 A1 | 1/2010 | Gotoh et al. | |
| 2012/0228551 A1 | 9/2012 | Emoto et al. | |
| 2012/0313507 A1 | 12/2012 | Hashimoto et al. | |
| 2013/0300014 A1 | 11/2013 | Emoto | |
| 2016/0355731 A1 | 12/2016 | Aoyagi et al. | |
| 2017/0037311 A1 | 2/2017 | Hosokawa et al. | |
| 2017/0166810 A1 | 6/2017 | Morikawa et al. | |
| 2017/0294561 A1 * | 10/2017 | Ikeda | C09K 11/0883 |
| 2018/0002601 A1 * | 1/2018 | Emoto | C09K 11/77348 |
| 2019/0330528 A1 | 10/2019 | Morikawa et al. | |
| 2022/0356396 A1 * | 11/2022 | Nomiyama | C09K 11/57 |

FOREIGN PATENT DOCUMENTS

| | | |
|---|---|---|
| JP | 2017-036430 A | 2/2017 |
| JP | 2017-110206 A | 6/2017 |
| JP | 2018-002870 A | 1/2018 |
| JP | 6572373 B1 | 9/2019 |
| JP | 2019-199531 A | 11/2019 |
| TW | I518169 B | 1/2016 |
| WO | 2011/058919 A1 | 5/2011 |
| WO | 2012/011444 A1 | 1/2012 |
| WO | 2014/030637 A1 | 2/2014 |

OTHER PUBLICATIONS

Sep. 7, 2023 Office Action issued in Taiwanese Patent Application No. 109128033.
Feb. 23, 2023 Office Action issued in Chinese Patent Application No. 202080058677.4.

* cited by examiner

BETA-SIALON PHOSPHOR PARTICLE AND LIGHT EMITTING DEVICE

TECHNICAL FIELD

The present invention relates to a β-sialon phosphor particle and a light emitting device.

BACKGROUND ART

There is known a light emitting device that combines a light emitting element that emits primary light and a phosphor that absorbs primary light and emits secondary light.

In recent years, as the output of light emitting devices has increased, the demand for heat resistance and durability of phosphors has increased. Therefore, β-sialon phosphors having a stable crystal structure are attracting attention.

A phosphor $Eu^{2+}$ doped in the crystal structure of β-sialon is a phosphor which is excited by ultraviolet to blue light and emits green light having wavelengths of 520 nm or more and 550 nm or less. The $Eu^{2+}$ doped β-sialon is also called the Eu-doped β-sialon. This phosphor is used as a green light emitting component of a light emitting device such as a white light emitting diode (white LED (light emitting diode)). The Eu-doped β-sialon has a very sharp emission spectrum among phosphors in which $Eu^{2+}$ is doped. Therefore, the Eu-doped β-sialon is a phosphor particularly suitable for a green light emitting component of a backlight source of a liquid crystal display panel requiring narrow-band emission composed of three primary colors of blue, green and red light.

Examples of the technique related to β-sialon phosphors include those described in Patent Document 1.

Patent Document 1 discloses a Eu-doped β-sialon represented by general formula: $Si_{6-z}Al_zO_zN_{8-z}$ (0<Z≤0.42), in which a 50% area average diameter of primary particles of the β-sialon is 5 μm or more.

RELATED DOCUMENT

Patent Document

[Patent Document 1] International Publication No. WO 2012/011444

SUMMARY OF THE INVENTION

Technical Problem

In recent years, further improvement in luminance has been required for β-sialon phosphors and light emitting devices.

The present invention has been made in view of such circumstances. The present invention provides a β-sialon phosphor and a light emitting device having improved luminance.

Solution to Problem

The present inventors have conducted various studies to improve luminance. In addition, as a result of studies, inventions to be provided below v/ere completed.

According to the present invention,
a europium-doped β-sialon phosphor particle,
in which, when an element concentration of a Si atom on a surface portion of the phosphor particle that is obtained by analyzing a cross section of the phosphor particle by an energy dispersive X-ray analysis method is indicated by Ps [at %], and an element concentration of a Si atom near a center of the phosphor particle that is obtained by an analysis by the same method is indicated by Pc [at %],
a Pc-Ps value is 3 at % or more
is provided.

In addition, according to the present invention,
a light emitting device including a light emitting light source and a wavelength conversion member,
in which the wavelength conversion member contains a phosphor, and
the phosphor contains the β-sialon phosphor particle
is provided.

Advantageous Effects of Invention

According to the present invention, a β-sialon phosphor particle and a light emitting device having improved luminance are provided.

DESCRIPTION OF EMBODIMENTS

Figure 1:
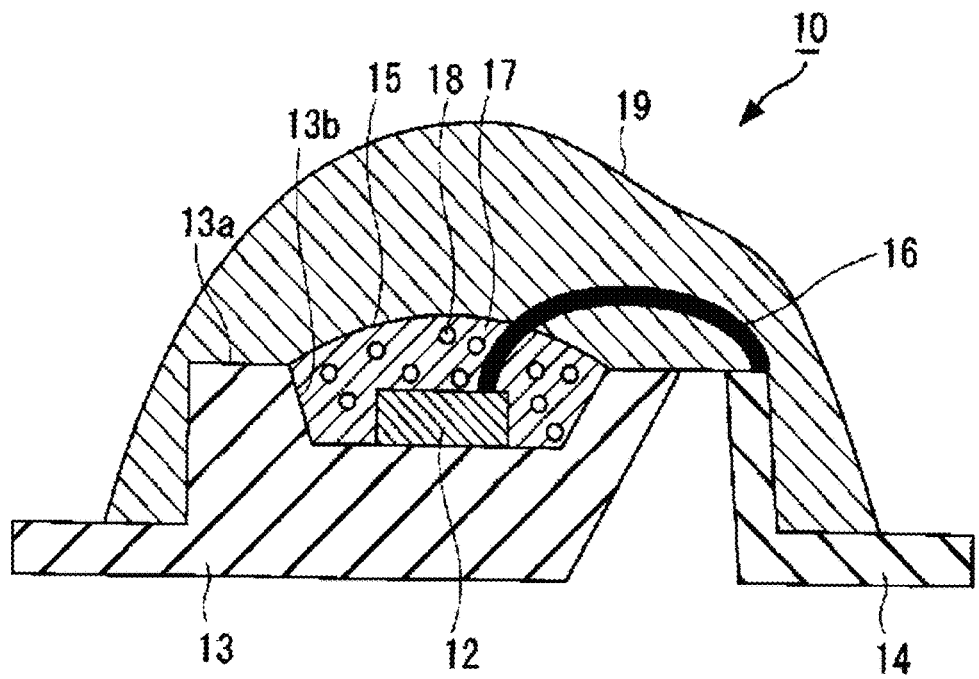
FIG. 1 is a cross-sectional view schematically showing an example of a structure of a light emitting device.

Hereinafter, an embodiment of the present invention will be described in detail while referring to drawings.

The drawings are simply intended for description. The shapes, dimensional ratios, or the like of individual members in the drawings do not necessarily correspond to actual articles.

In the present specification, unless particularly otherwise described explicitly, the term "substantially" indicates that production tolerances, assembly variations, and the like are included in ranges.

<β-sialon Phosphor Particle>

A β-sialon phosphor particle of the present embodiment is a europium-doped β-sialon phosphor particle.

When the element concentration of a Si atom on the surface portion of the phosphor particle that is obtained by analyzing a cross section of the phosphor particle by the energy dispersive X-ray analysis method (also abbreviated as the EDX method) is indicated by Ps [at %], and the element concentration of a Si atom near the center of the phosphor particle that is obtained by an analysis by the same method is indicated by Pc [at %], the Pc-Ps value is 3 at % or more.

It is mentioned for confirmation that, in the present embodiment, attention is paid to the relationship between Pc and Ps or the like when a cut surface obtained by cutting a primary particle or a secondary particle (preferably a primary particle) is analyzed by the EDX method. The primary particle is a single particle that is not crushed even with a significant mechanical stress. An aggregate of primary particles is referred to as a secondary particle.

The primary particles may be a single crystal particle or a polycrystal particle.

The β-sialon phosphor of the present embodiment is, for example, a phosphor made of $Eu^{2+}$-doped β-sialon that is represented by general formula $Si_{6-z}Al_zO_zN_{8-z}$: $Eu^{2+}$ (0<Z≤4.2). Hereinafter, the europium-doped β-sialon is also simply referred to as β-sialon. In the general formula $Si_{6-}$ $_zAl_zO_zN_{8-z}$: $Eu^{2+}$, the Z value and the content of europium are not particularly limited. The Z value is, for example, more than 0 and 4.2 or less and preferably 0.005 or more and 1.0 or less from the viewpoint of further improving the light emitting intensity of the β-sialon phosphor. Further, the content of europium is preferably 0.1% by mass or more and 2.0% by mass or less.

In the β-sialon phosphor particle of the present embodiment, when the Pc-Ps value is 3 at % or more, that is, the Si concentration near the center is high and the Si concentration on the surface portion is low, the luminance improves. The reason therefor is not clear but is assumed as described later.

The present inventors found that Si tends to absorb light in a wide wavelength range from ultraviolet to visible light. Therefore, it is assumed that, particularly when Si generated by the partial decomposition of β-sialon or a compound that is formed from Si is present on the surface of the phosphor particle, the luminance significantly decreases. Therefore, it is considered that, when the amount of Si that does not contribute to light emission is small on the surface portion of the phosphor particle as in the present embodiment, the luminance improves.

In obtaining the β-sialon phosphor of the present embodiment, it is preferable to select an appropriate production method in addition to selecting appropriate raw materials. For example, a β-sialon phosphor having a Pc-Ps value of 3 at % or more can be obtained by performing two-stage firing of a first firing step and a second firing step, which will be described later, and/or by performing an acid treatment as a treatment after the firing.

Hereinafter, the β-sialon phosphor particle of the present embodiment will be more specifically described.
(Regarding Ps and Pc)

Ps is preferably 20 at % or more and 35 at % or less and more preferably 22 at % or more and 35 at % or less.

Pc is preferably 23 at % or more and 50 at % or less, more preferably 30 at % or more and 50 at % or less, and still more preferably 35 at % or more and 45 at % or less.

The difference (Pc-Ps) between Pc and Ps is at least 3 at %, more preferably at least 5 at %, and still more preferably at least 6.5 at %. When the difference between Pc and Ps is designed to be sufficiently large, the luminance can be further increased.

From the viewpoint of a realistic design, the difference between Pc and Ps is usually at most 20 at %, preferably at most 17.5 at %, and more preferably at most 15 at %.
(Abundance of Elements Other than Si)

The β-sialon phosphor particle of the present embodiment is "sialon" and thus usually contains Al, O and N in addition to Si. In addition, the β-sialon phosphor particle of the present embodiment contains Eu. The chemical composition according to a general formula is as described above.

For confirmation, the preferable rates of each element other than Si on the surface portion and near the center of the phosphor particle will be described. It is considered that, when these rates are within appropriate ranges, the luminance further improves. These rates can also be obtained by the EDX method.
Rate of Each Element on Surface Portion of Phosphor Particle Al: Preferably 0.05 at % or more and 10 at % or less, more preferably 0.2 at % or more and 7.5 at % or less, and still more preferably 0.3 at % or more and 5 at % or less Eu: Preferably 0.01 at % or more and 1 at % or less, more preferably 0.02 at % or more and 0.75 at % or less and still more preferably 0.02 at % or more and 0.5 at % or less N: Preferably 40 at % or more and 75 at % or less and more preferably 45 at % or more and 70 at % or less O: Preferably 5 at % or more and 25 at % or less, preferably 10 at % or more and 20 at % or less, more preferably 12 at % or more and 18 at % or less, and still more preferably 12 at % or more and 17 at % or less
Rate of Each Element Near Center of Phosphor Particle Al: Preferably 0.1 at % or more and 5 at % or less, more preferably 0.5 at % or more and 5 at % or less, and still more preferably 0.5 at % or more and 4 at % or less Eu: Preferably 0.01 at % or more and 0.5 at % or less, more preferably 0.02 at % or more and 0.3 at % or less, and still more preferably 0.02 at % or more and 0.2 at % or less N: Preferably 45 at % or more and 65 at % or less and more preferably 50 at % or more and 60 at % or less O: Preferably 1 at % or more and 10 at % or less, more preferably 1 at % or more and 7.5 all or less, and still more preferably 1 at % or more and 6 at % or less
(Supplement Regarding EDX Method)

In the present embodiment, Ps, Pc, and the like are obtained by exposing a "cross section" of the β-sialon phosphor particle and analyzing the cross section the EDX method.

A well-known ion milling method (more specifically, a cross-section milling method) can be applied to expose the cross section of the phosphor particle. That is, the cross section of the particle can be exposed by irradiating a sample with ions accelerated by an electric field to flick off atoms on the surface of the sample.

The EDX method is a method in which an element or a composition is analyzed by detecting characteristic X-rays that are generated by electron beam irradiation and dispersing the characteristic X-rays with energy. Since characteristic X-rays have intrinsic energy attributed to an element, the element can be analyzed by measuring these characteristic X-rays.

A device for performing energy dispersive X-ray analysis is often attached to scanning electron microscopes (SEMs) or transmission electron microscopes (TEMs). Therefore, it is possible to determine a position (surface portion/near the center) where an element is analyzed while viewing an image obtained with the SEM or TEM.

In the measurement of Pc, it is not necessary to measure the element concentration strictly at the "center" (geometric center of gravity or the like) as long as the element concentration of a Si atom "near" the center of the phosphor particle can be measured. In a commonsensical manner, it is preferable to measure the element concentration at a portion sufficiently inside the surface of the particle. Similarly, in the measurement of Ps as well, it is not necessary to measure the element concentration strictly on the "particle surface". The element concentration may be measured in a portion sufficiently close to the particle surface.

When the above-described assumed action mechanism, that is, "it is considered that, when the amount of Si that does not contribute to light emission is small on the surface portion of the phosphor particle as in the present embodiment, the luminance improves" is taken into account, as long as Pc-Ps can be confirmed to be 3 at % or more by measuring the Si element concentration Pc 'near' the center and the Si element concentration Ps on the surface portion instead of measuring the element concentrations strictly at the "center" and on the "surface", it is conceivable that a sufficient luminance improvement effect can be obtained.

In addition, regarding Ps, Ps measured in at least one point on the surface of the phosphor particle needs to satisfy the relationship of Pc−P≥3 at %. In other words, when the concentration of a Si atom is measured at several points on the surface of the phosphor particle and the smallest value is regarded as Ps, the relationship is considered to be satisfied as long as the value of Pc−Ps is 3 at % or more.

This is because, while a case where the Ps value is not uniform throughout the entire surface of the phosphor particle is also conceivable, as long as the element concentration of a Si atom is sufficiently lower in at least a part of the surface of the phosphor particle than that near the center, the sufficient luminance improvement effect can be obtained in at least that part.

Further, in the present embodiment, Pc and Ps may satisfy the predetermined relationship when Pc and Ps are measured in at least one randomly-selected β-sialon phosphor particle. As long as the predetermined relationship between Pc and Ps is satisfied in one particle in an aggregate of the β-sialon phosphor particles produced from the same raw materials by the same production method, in the aggregate, a significant amount of particles other than the above-described particle (while not all of the other particles) should satisfy the predetermined relationship between Pc and Ps.

(Particle Size)

When the particle size of the β-sialon phosphor particle of the present embodiment is appropriate, the luminance can be further increased.

Specifically, the 50% diameter $D_{v50}$ (volume-based median diameter) in the cumulative volume in particle size distribution of the β-sialon phosphor particle of the present embodiment (exactly, a phosphor powder containing the β-sialon phosphor particle of the present embodiment) is preferably 5 μm or more and more preferably 10 μm or more. In addition, the upper limit value of $D_{v50}$ is preferably 50 μm and more preferably 30 μm.

$D_{v50}$ can be obtained by the laser diffraction scattering method based on JIS R 1629: 1997. In the measurement of $D_{V50}$, it is preferable to perform a pretreatment such as a dispersion treatment with an ultrasonic homogenizer such the particles are aggregated as little as possible. Regarding specific conditions of the pretreatment, details of a measuring device, and the like, examples to foe described later need to be referenced.

As another viewpoint, the primary particle size (circle equivalent size) that is obtained by observing the β-sialon phosphor particle of the present embodiment with a scanning electron microscope is preferably 5 μm or more and 50 μm or less and more preferably 10 μm or more and 30 μm or less.

The β-sialon phosphor particle of the present embodiment is excited in a wide wavelength range from ultraviolet rays to visible light and emits green light having a main wavelength in a range of 520 nm or more and 550 nm or less with high efficiency. Therefore, the β-sialon phosphor particle is excellent as a green light-emitting phosphor.

Further, the β-sialon phosphor particle of the present embodiment can be suitably used as a material for a phosphor layer in a light emitting element. The light emitting element can be applied to a light emitting device such as a backlight source of a display or a lighting device. While not particularly limited, the light emitting element includes an LSD and a phosphor layer laminated on the light emitting surface side of the LED. As the LED, an ultraviolet LED or blue LED that emits light having a wavelength of 300 nm or more and 500 nm or less, particularly, a blue LED that emits light having a wavelength of 440 nm or more and 480 nm or less can be used. In particular, a β-sialon phosphor particle obtained by a production method to be described later is excited at a wide wavelength from ultraviolet to blue light and emits green light with high luminance and thus can be suitably used as a phosphor for a white LED in which blue or ultraviolet light is used as a light source.

(Production Method)

As briefly described above, the β-sialon phosphor particle of the present embodiment is produced by selecting an appropriate production method in addition to selecting appropriate raw materials. Specifically, the β-sialon phosphor particle of the present embodiment can be obtained by adopting production efforts such as performing a firing step by separately adding a europium compound, which is one of the raw materials, twice or more, producing the β-sialon phosphor particle by adding a sufficiently large amount of the europium compound in the second firing step, performing an annealing step, and performing an acid treatment after the firing.

However, for the β-sialon phosphor particle of the present embodiment, various other specific production conditions can be adopted on the premise that the above-described production efforts are adopted.

Hereinafter, a method for producing a β-sialon phosphor particle will be more specifically described.

The method for producing a β-sialon phosphor particle of the present embodiment preferably includes two firing steps. That is, the method for producing a β-sialon phosphor particle of the present embodiment preferably includes (i) a first firing step of firing a first raw material powder containing a first europium compound to obtain a first fired powder containing a β-sialon particle.

(ii) a second firing step of firing the obtained first fired powder and a second raw material powder containing a second europium compound to obtain the β-sialon phosphor particle of the present embodiment.

Here, in the second firing step, the second europium compound is preferably added in a larger amount than the conventional standard. Specifically, in the second firing step, the second europium compound is preferably added so that the amount of Eu exceeds the amount of Eu that can be doped in β-sialon.

While not clear in detail, it is considered that, when the second europium compound is added so that the amount of Eu exceeds the amount of Eu that can be doped in β-sialon in the second firing step, the element distribution differs between the surface layer portion and the inside of the particle of a phosphor. In addition, it is considered that, in such a case, a β-sialon phosphor in which Pc and Ps have a desired relationship can be obtained.

The method for producing a β-sialon phosphor particle may further include a third firing step of further firing the second fired powder to obtain a third fired powder once or more. At that time, a europium compound may be further added.

Here, in the present embodiment, the "first firing step" means a first firing step in which a raw material powder containing a first europium compound is heat-treated, the "second firing step" means a second firing step in which a second europium compound is added and heat-treated, and the "third firing step" means a firing step performed after the second firing step.

Further, in the present embodiment, the "first europium, compound" means the europium compound added in the first firing step, and the "second europium compound" means a europium compound added in the second firing step.

Further, in the present embodiment, the "first raw material powder" means a raw material powder used in the first firing step, and the "second raw material, powder" is a raw material powder used in the second firing step. It is preferable that each raw material powder is mixed.

Further, in the present embodiment, the "first fired powder" means a product obtained in the first firing step, the "second fired powder" means a product obtained in the second firing step, and the "third fired powder" means a product obtained in the third firing step.

Further, in the present embodiment, the term "step" includes not only independent steps but also steps that cannot be clearly distinguished from other steps as long as the intended purpose of the step is achieved. The content of europium in the composition means, when a plurality of substances corresponding to europium are present in the composition, the total amount of the plurality of substances present in the composition unless particularly otherwise specified.

The first raw material powder preferably contains silicon nitride and aluminum nitride in addition to the first europium compound. The silicon nitride and aluminum compounds are materials for forming the skeleton of β-sialon, and the europium compound is a material for forming an emission center.

The first raw material powder may further contain β-sialon. β-sialon is a material serving as an aggregate or core material.

The form of each of the above components contained in the first raw material powder is not particularly limited. The form of each of the above components is preferably a powder form.

A europium compound that can be used is not particularly limited. Examples thereof include an oxide containing europium, a hydroxide containing europium, a nitride containing europium, an oxynitride containing europium, and a halide containing europium. These can be used alone or in combination of two or more. Among them, europium oxide, europium nitride and europium, fluoride are preferably used alone, and europium oxide is more preferably used alone.

The europium compound is preferably added separately before firing in a plurality of firing steps. Specifically, the europium compound is added before the first firing step and the second firing step, respectively.

In each firing step, europium is divided into those that are doped in β-sialon, those that volatilize, and those that remain as a heterophase component. The heterophase component containing europium can be removed by an acid treatment or the like. However, in a case where a significantly large amount of insoluble components generated by the acid treatment are generated, a component that is not dissolved by the acid treatment may be generated and the luminance may decrease. Incidentally, a heterophase that does not absorb excess light may remain, and europium may be contained in this heterophase. When the europium compound is added before firing in a plurality of firing steps, a β-sialon phosphor raw material other than the europium compound may be added together with the europium compound.

In the method for producing a β-sialon phosphor particle, when the total of the first fired powder and the second europium compound is set to 100% by mass, the ratio of the second europium compound is preferably 1.0% by mass or more, more preferably 2.0% by mass or more, and still more preferably 3.0% by mass or more from the viewpoint of more effectively removing Eu that does not contribute to improvement in the luminance of the β-sialon phosphor particle and further improving the luminance of the obtained β-sialon phosphor particle. Further, from the viewpoint of reducing the amount of insoluble heterophase components generated by the acid treatment and further improving the luminance of the obtained β-sialon phosphor particle, the ratio of the second europium compound is preferably 18.0% by mass or less, more preferably 17.0% by mass or less, and still more preferably 15.0% by mass or less.

In the method for producing a β-sialon phosphor particle of the present embodiment, when the ratio of the second europium compound is within the above range, Eu that does not contribute to the luminance improvement of the β-sialon phosphor can be removed more effectively, and at the same time, it is possible to suppress the generation of insoluble heterophase components generated by the acid treatment. Therefore, the production step of removing the heterophase component or the like can be simplified, and as a result, the production time of the β-sialon phosphor particle can be shortened.

The total amount of europium contained in the first raw material powder and the second raw material powder is not particularly limited, but is preferably 3 times or more the amount of europium doped in the finally obtained β-sialon phosphor particle, and more preferably 4 times or more.

Further, the total amount of europium contained in the first raw material powder and the second raw material powder is preferably 18 times or less the amount of europium doped in the finally obtained β-sialon phosphor. As a result, the amount of insoluble heterophase components generated by the acid treatment can be reduced, and the luminance of the obtained β-sialon phosphor can be further improved.

The amount of europium contained in the first raw material powder is not particularly limited. However, this amount is preferably larger than the amount of europium doped in the finally obtained β-sialon phosphor.

Further, the amount of europium contained in the first raw material powder is preferably 3 times or less the amount of europium doped in the finally obtained β-sialon phosphor particle. As a result, the amount of insoluble heterophase components generated by the acid treatment can be reduced, and the luminance of the obtained β-sialon phosphor particle can be further improved.

In each firing step, the raw material powder containing the europium compound can be obtained by, for example, a method of dry mixing, a method of wet mixing in an inert solvent that does not substantially react with each component of the raw material, and then removing the solvent. The mixing device is not particularly limited, but for example, a V-type mixer, a locking mixer, a ball mill, a vibration mill, or the like can be used.

The firing temperature in each firing step is not particularly limited. The firing temperature is preferably 1800° C. or higher and 2100° C. or lower.

When the firing temperature is 1800° C. or higher, grain growth proceeds more effectively. In addition, the light absorption rate, the internal quantum efficiency, and the external quantum efficiency can be further improved.

When the firing temperature is 2100° C. or lower, the decomposition of the phosphor can be sufficiently suppressed. In addition, the light absorption rate, the internal quantum efficiency, and the external quantum efficiency can be further improved.

Other conditions such as the heating time, the heating rate, the heating holding time, and the pressure in each firing step are not particularly limited. These conditions may be appropriately adjusted according to the raw materials used and the like. Typically, the heating holding time is 3 hours or longer and 30 hours or shorter, and the pressure is 0.6 MPa or more and 10 MPa or less.

In each firing step, as a method for firing a mixture, for example, a method of loading the mixture into a container made of a material that does not react with the mixture during firing (for example, boron nitride) and heating the mixture in a nitrogen atmosphere can be used. By using such a method, a crystal growth reaction, a solid solution reaction, or the like can be advanced to obtain a β-sialon phosphor particle.

The first fired powder and the second fired powder are granular or lumpy sintered bodies. The granular or lumpy sintered body can be made into a β-sialon phosphor particle having a predetermined size by using treatments such as crushing, pulverization, classification, or the like alone or in combination.

Specific examples of the treatment method include a method of pulverizing the sintered body to a predetermined particle size using a general pulverizer such as a ball mill, a vibration mill, or a jet mill. However, excessive pulverization does not only generate fine particles that are likely to scatter light, but may also cause crystal defects on the particle surface. That is, excessive pulverization may cause a decrease in the luminous efficiency of the β-sialon phosphor particle and thus needs to be avoided. That is, this treatment may be performed after the acid treatment or an alkaline treatment described later.

The method for producing a β-sialon phosphor particle may further include, after the second firing step, an annealing step of heating the second fired powder at a temperature lower than the firing temperature of the second firing step to obtain an annealed product.

The annealing step is preferably performed in an inert gas such as a rare gas and a nitrogen gas, a reducing gas such as a hydrogen gas, a carbon monoxide gas, a hydrocarbon gas, and an ammonia gas, or a mixed gas thereof, or in a non-oxidizing atmosphere other than pure nitrogen such as a vacuum. The annealing step is particularly preferably performed in a hydrogen gas atmosphere or an argon atmosphere.

The annealing step may be performed under atmospheric pressure or pressurization.

The heat treatment temperature in the annealing step is not particularly limited. The heat treatment temperature is preferably 1200° C. or higher and 1700° C. or lower and more preferably 1300° C. or higher and 1600° C. or lower.

By performing the annealing step, the luminous efficiency of the β-sialon phosphor particle can be further improved. Further, the rearrangement of the elements removes strains and defects, so that transparency can also be improved.

That is, a heterophase may be generated by the annealing step, but this can be removed by an acid treatment or the like described later.

Before the annealing step, the compound of the element configuring the β-sialon phosphor particle may be added and mixed. The compound to be added is not particularly limited, and examples thereof include an oxide, a nitride, an oxynitride, a fluoride, and a chloride of each element.

In particular, by adding silica, aluminum oxide, europium oxide, europium fluoride, or the like to each heat-treated product, the luminance of the β-sialon phosphor can be further improved. However, it is desirable that the undissolved residue of the raw material to be added can be removed by acid treatment, alkaline treatment, or the like after the annealing step.

In the method for producing a β-sialon phosphor particle, a step of performing an acid treatment, an alkaline treatment, and/or a fluorine treatment on the second fired powder or the annealed product of the second fired powder may be further performed.

The acid treatment or the alkaline treatment is a treatment in which, for example, an acidic or alkaline liquid is brought into contact with the second fired powder or the annealed product of the second fired powder. The fluorine treatment is, for example, a step of bringing a gas containing fluorine into contact with the second fired powder or the annealed product of the second fired powder.

It is considered that, by performing such a step, it is possible to dissolve and remove the heterophase component (luminescence inhibitor) generated in the firing step, the annealing step, and the like. Therefore, the light absorption rate, the internal quantum efficiency, and the external quantum efficiency of the β-sialon phosphor particle can be further improved. Further, it is considered that the appropriate removal of Si near the surface of the particles facilitates the production of a particle in which Pc and Ps have a desired relationship.

As the acidic liquid, for example, an aqueous solution containing one or more acids selected from hydrofluoric acid, sulfuric acid, phosphoric acid, hydrochloric acid, and nitric acid can be used. As the alkaline liquid, for example, an aqueous solution containing one or more alkalis selected from potassium hydroxide, aqueous ammonia, and sodium hydroxide can be used, but an acidic aqueous solution is more preferable, and a mixed aqueous solution of hydrofluoric acid and nitric acid is particularly preferable.

The treatment method using the acidic or alkaline liquid is not particularly limited, and the treatment can be performed by dispersing the second fired powder or the annealed product of the second fired powder in the aqueous solution containing an acid or an alkali and stirring the second fired powder or the annealed product for about several minutes to several hours (for example, 10 minutes to 6 hours). A well-known stirrer or the like can be used for stirring. The temperature during the stirring is, for example, 50° C. to 100° C. and preferably 65° C. to 85° C. (the liquid is maintained at this temperature). The stirring time is, for example, 1 minute to 2 hours and preferably about 10 minutes to 1 hour. The stirring speed is, for example, 300 to 600 rpm and preferably 400 to 500 rpm.

After this treatment, it is desirable to separate substances other than the β-sialon phosphor particle by filtration and wash the substances adhering to the ≠-sialon phosphor with water.

<Light Emitting Device>

A light emitting device of the present embodiment is a light emitting device including a light emitting light source and a wavelength conversion member. The wavelength conversion member contains a phosphor. In addition, the phosphor includes the β-sialon phosphor particle of the present embodiment (the β-sialon phosphor particle described above).

FIG. 1 is a cross-sectional view schematically showing an example of a structure of a light emitting device 10.

The light emitting device 10 shown in FIG. 1 includes an LED chip as a light emitting light source 12, a first lead frame 13 on which the light emitting light source 12 is mounted, a second lead frame 14, a wavelength conversion member 15 that covers the light emitting light source 12, a bonding wire 16 that electrically connects the light emitting light source 12 and the second lead frame 14, and a cap 19 made of synthetic resin that covers these. The wavelength conversion member 15 has a phosphor 18 and a sealing resin 17 in which the phosphor 18 is dispersed.

On an upper portion 13a of the first lead frame 13, a recess portion 13b is formed for mounting a light emitting diode chip as the light emitting light source 12. The recess portion 13b has a substantially funnel shape in which the hole diameter gradually expands upward from the bottom surface thereof, and the inner surface of the recess portion 13b serves as a reflective surface. An electrode on the lower surface side of the light emitting light source 12 is die-bonded to a bottom surface of the reflective surface. Another electrode formed on an upper surface of the light emitting light source 12 is connected to a surface of the second lead frame 14 via the bonding wire 16.

Various LEO chips can be used as the light emitting light source 12. Particularly prefer red is an LED chip that generates light having a wavelength of blue light from near ultraviolet of 300 nm or more and 500 nm or less.

The phosphor 18 used for the wavelength conversion member 15 of the light emitting device 10 includes the β-sialon phosphor particle of the present embodiment. Further, from the viewpoint of controlling the light wavelength control of the light emitting device 10, the phosphor 18 may further contain a phosphor such as an α-sialon phosphor, a KSF-based phosphor, a single substance, or a mixture of $CaAlSiN_3$ or YAG in addition to the β-sialon phosphor particle the present embodiment. Examples of the element doped in these phosphors include europium (Eu), cerium (Ce), strontium (Sr), calcium (Ca), and manganese (Mn). These phosphors may be used alone or in combination of two or more.

Among these, the phosphor used in combination with the β-sialon phosphor particle of the present embodiment is preferably a manganese-doped KSF-based phosphor. By using the β-sialon phosphor of the present embodiment showing green color and the KSF-based phosphor showing red color in combination, it can be suitably used as a backlight LED suitable for a high color rendering TV, for example. By combining the light emitting light source 12 and the wavelength conversion member 15, light having a high light emitting intensity can be emitted.

It is mentioned for confirmation that the manganese-doped KSF-based phosphor can be represented by general formula: $A_2M_{(1-n)}F_6:Mn^{4+}{}_n$. In this general formula, the element A is one or more alkali metal elements containing K, the element M is a combination with one or more element selected from the group consisting of Si single substance, Ge single substance, or Si and Ge, Sn, Ti, Zr and Hf, and $0<b\le0.1$.

In the case of the light emitting device 10 using the β-sialon phosphor particle of the present embodiment, the light emitting light source 12 radiates particularly near-ultraviolet light or visible light containing a wavelength of 300 nm or more and 500 nm or less as an excitation source, the light emitting device 10 has green light emission characteristics having a peak at a wavelength in a range of 520 nm or more and 550 nm or less. Therefore, by using a near-ultraviolet LED chip or a blue LED chip as the light emitting light source 12 and the β-sialon phosphor of the present embodiment, and further combining a single substance or a mixture of a red light emitting phosphor, a blue light emitting phosphor, a yellow light emitting phosphor, or an orange light emitting phosphor having wavelengths of 600 nm or more and 700 nm or less, the light emitting device 10 is capable of emitting white light.

Since the light emitting device 10 contains a β-sialon phosphor particle having improved light emitting intensity, the luminance is favorable.

Hitherto, the embodiment of the present invention has been described, but the embodiment is an example of the present invention, and it is possible to adopt a variety of configurations other than the above-described configuration. Further, the present invention is not limited to the above-described embodiment, and modifications, improvements, and the like are included in the present invention as long as the object of the present invention can be achieved.

EXAMPLES

The embodiment of the present invention will be described in detail based on examples and comparative examples. It is mentioned for confirmation that the present invention is not limited only to examples.

Example 1

Using a V-type mixer (S-3 manufactured by Tsutsui Scientific Instruments Co., Ltd.), 95.80% by mass of an α-silicon nitride powder (SN-E10 grade, oxygen content 1.0% by mass) manufactured by Ube Industries, Ltd., 2.74% by mass of an aluminum nitride powder (F grade, oxygen content 0.8% by mass) manufactured by Tokuyama Corporation, 0.56% by mass of aluminum oxide powder (TM-DAR grade) manufactured by TAIMEI CHEMICALS Co., Ltd., and 0.90% by mass of a europium oxide powder (RU grade) manufactured by Shin-Etsu Chemical Co., Ltd. were mixed, and then the obtained mixture was passed through a sieve having a mesh size of 250 μm to remove aggregates, thereby obtaining a first raw material mixed powder. The compounding ratio (referred to as first compounding composition (% by mass)) here was designed such that, in general formula of β-sialon: $Si_{6-Z}Al_ZO_ZN_{8-Z}$, Z was calculated from the Si/Al ratio with europium oxide excluded and became 0.22.

A cylindrical boron nitride container with a lid and having an inner diameter of 10 cm and a height of 10 cm was filled with 200 g of the obtained raw material powder having the first compounding composition, and a heat treatment (first firing step) was performed at 1950° C. for 10 hours in a pressurized nitrogen atmosphere of 0.8 MPa in an electric furnace having a carbon heater. The powder subjected to the heat treatment was pulverized by a supersonic jet crusher (PJM-80SP, manufactured by Nippon Pneumatic Mfg. Co., Ltd.), and then the obtained pulverized product was passed through a nylon sieve having a mesh size of 45 pm to obtain a first fired powder. The obtained first fired powder and a europium oxide powder (RU grade) manufactured by Shin-Etsu Chemical Co., Ltd. were compounded at a compounding ratio of 90:10 (referred to as the second compounding composition (% by mass)), and the first fired powder and the europium oxide powder were mixed using a V-type mixer (S-3 manufactured by Tsutsui Scientific Instruments Co., Ltd.). Subsequently, the obtained mixture was passed through a nylon sieve having a mesh size of 250 μm to remove aggregates, thereby obtaining a second raw material mixed powder.

A cylindrical boron nitride container with a lid and having an inner diameter of 10 cm and a height of 10 cm was filled with 200 g of the obtained raw material powder having the second compounding composition, and a heat treatment (second firing step) was performed at 2020° C. for 12 hours in a pressurized nitrogen atmosphere of 0.8 MPa in an electric furnace having a carbon heater. The powder subjected to the heat treatment was pulverized by a supersonic jet crusher (PJM-80SP, manufactured by Nippon Pneumatic Mfg. Co., Ltd.), and then the obtained pulverized product was passed through a nylon sieve having a mesh size of 45 µm to obtain a second fired powder. The passing rate of the sieve was 92%.

A cylindrical boron nitride container with a lid and having an inner diameter of 5 cm and a height of 3.5 cm was filled with 20 g of the second fired powder, and an annealing treatment was performed at 1500° C. for 8 hours in an atmospheric pressure argon atmosphere in an electric furnace having a carbon heater. The powder subjected to the annealing treatment was injected into a 1:1 mixed acid of 50% hydrofluoric acid and 70% nitric acid held at 75° C. Then, while the powder was held at 75° C., an acid treatment was performed by immersing the powder in the mixed acid at 75° C. for 30 minutes while being stirred at a rotation speed of 450 rpm using a magnetic stirrer. The powder after the acid treatment was precipitated as it was, decantation for removing the supernatant liquid and fine powder was repeated until the pH of the solution was 5 or more and the supernatant liquid became transparent, and the finally obtained precipitate was filtered and dried to obtain a phosphor powder of Example 1.

As a result of powder X-ray diffraction measurement, it was found that the crystal phase present was a β-sialon single phase and a β-sialon phosphor was obtained.

The first compounding composition and the second compounding composition in Example 1 are shown in Table 1 shown below.

<Measurement of $D_{v50}$>

The particle size distribution of the β-sialon phosphor particles of Example 1 was measured by a laser diffraction scattering method based on JIS R 1629: 1997 using Microtrac MT3300EX II (MicrotracBEL Corp.). A pretreatment of a measurement sample was performed as follows.

0.5 g Of β-sialon phosphor particles were injected into 100 cc of ion-exchanged water, and a dispersion treatment was performed thereon for 3 minutes with Ultrasonic Homogenizer US-150E (Nissei Corporation, chip size φ20 mm. Amplitude 100%, oscillation frequency 19.5 KHz, amplitude about 31 µm). This was used as a sample for measurement.

The particle size distribution of the sample for measurement was measured using the above device. $D_{v50}$ was obtained from the obtained particle size distribution.

$D_{v50}$ is shown in Table 1 shown below.

<Analysis of Element Concentration by EDX Method>

The element concentration was analyzed as follows.

(1) First, among the β-sialon phosphor particles of Example 1, a particle that was recognized as a primary particle was cut with an ion milling device.

(2) On to the cut surface obtained in the (1), EDX measurement was performed using JED-2300 manufactured by JEOL Ltd. under conditions of an acceleration voltage of 15 kV and a measurement, time of 50 sec.

Figure 2:
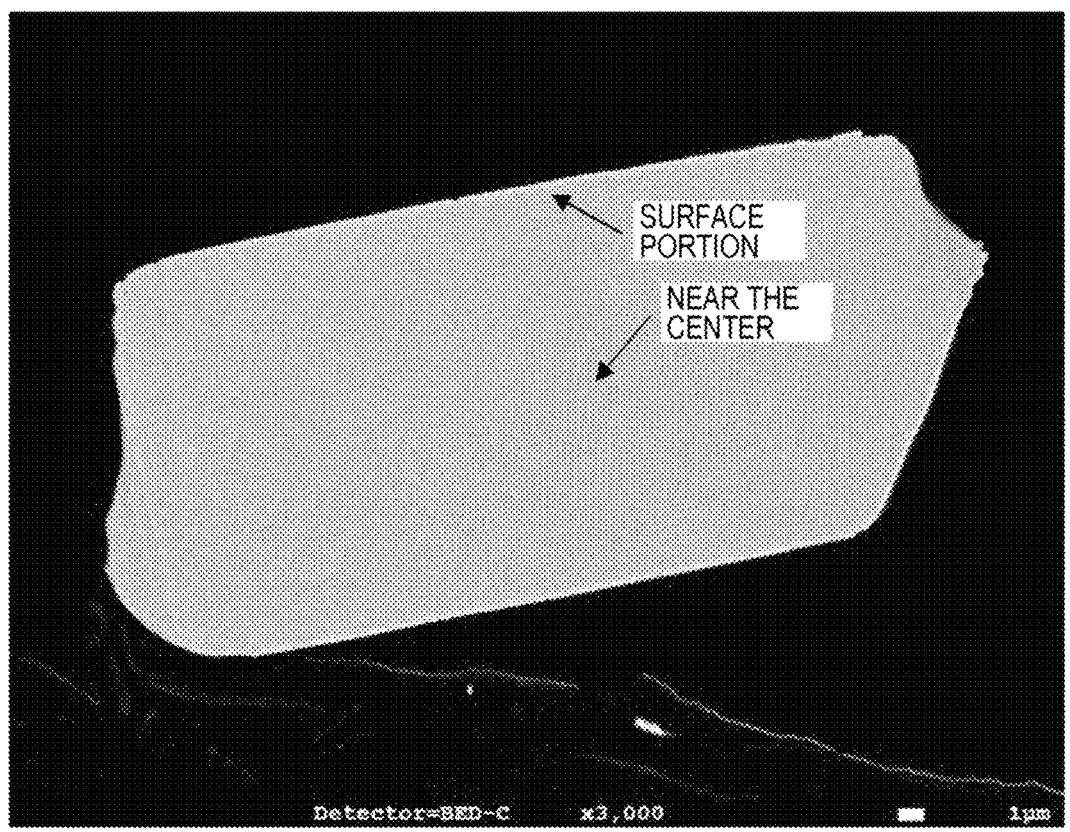
FIG. 2 is a view for describing a measurement point of an energy dispersive X-ray analysis method.

The measurement was performed at one point near the center of the cut surface and at one point in an end portion of the cut surface (corresponding to the surface portion of the particle before being cut). For reference, measurement points in the particle of Example 2 are shown in FIG. 2.

The obtained data was analyzed with software to obtain the concentration of each element.

The analysis results of the element concentrations are shown in Table 2 shown below.

<Evaluation of Fluorescence Characteristics>

The fluorescence characteristics of the β-sialon phosphor particle were evaluated by the peak intensity and peak wavelength measured by the following methods.

As a device, a spectrofluorometer (F-7000, manufactured by Hitachi High-Technologies Corporation) calibrated by the Rhodamine B method and a standard light source was used. A dedicated solid sample holder was filled with the obtained phosphor powder, then, the fluorescence spectrum when irradiated with excitation light dispersed at a wavelength of 455 nm was measured using a spectrofluorometer, and the peak intensity and peak wavelength were obtained from the obtained fluorescence spectrum. The obtained results are shown in Table 3.

It is mentioned for confirmation that, since the peak intensity varies depending on the measuring device and conditions, the unit is an arbitrary unit, the peak intensity was measured under the same condition in each of the examples and the comparative examples, and the β-sialon phosphor particle of each of the examples and the comparative examples was continuously measured and compared. Table 3 shows peak intensities when the peak intensity of the β-sialon phosphor of Comparative Example 1 is standardized to 100%.

<CIE Chromaticity>

The CIE (Commission Internationale de l'Eclairage) chromaticity of the fluorescence spectrum was obtained by measuring the emission spectrum of the total light flux obtained by collecting the fluorescence for excitation at 455 nm by using an integrating sphere in an instantaneous multi-photometry system (MCPD-7000, manufactured by Otsuka Electronics Co., Ltd.).

Example 2

A B-sialon phosphor particle was obtained by the same raw materials and methods as in Example 1. As a result of powder X-ray diffraction measurement of the obtained β-sialon phosphor particle, the crystal phase present was a β-sialon single phase.

Further, the same analysis or evaluation as in Example 1 was performed. The compounding composition, $D_{v50}$, the analysis result of the element concentration by the EDX method, and the evaluation results of the fluorescence characteristics are shown in Table 1 to Table 3.

As shown in, for example, Table 2, even when the particle was produced by the same raw materials and methods as in Example 1, the individual element concentrations on the surface portion and near the center of the particle were different from those in Example 1. This is assumed to be attributed to a slight production error.

Example3

A β-sialon phosphor particle was obtained by the same method as in Example 1 except that the second compounding composition was changed to a compounding ratio shown in Table 1. As a result of powder X-ray diffraction measurement of the obtained β-sialon phosphor particle, the crystal phase present was a β-sialon single phase. Further, the same analysis or evaluation as in Example 1 was performed. The compounding composition, $D_{v50}$, the analysis result of the element concentration by the EDX method, and the evaluation results of the fluorescence characteristics are shown in Table 1 to Table 3.

Example 4

A B-sialon phosphor particle was obtained by the same raw materials and methods as in Example 3. As a result of powder X-ray diffraction measurement of the obtained β-sialon phosphor particle, the crystal phase present was a β-sialon single phase.

Further, the same analysis or evaluation as in Example 1 was performed. The compounding composition, $D_{v50}$, the analysis result of the element concentration by the EDX method, and the evaluation results of the fluorescence characteristics are shown in Table 1 to Table 3.

As shown in, for example, Table 2, even when the particle was produced by the same raw materials and methods as in Example 3, the individual element concentrations on the surface portion and near the center of the particle were different from those in Example 3. This is assumed to be attributed to a slight production error.

Comparative Example 1

A β-sialon phosphor particle was obtained by the same method as in Example 1 except that the step corresponding to the second firing step in Example 1 was not performed. As a result of powder X-ray diffraction measurement of the obtained β-sialon phosphor particle, the crystal phase present was a β-sialon single phase.

Further, the same analysis or evaluation as in Example 1 was performed. The compounding composition, $D_{v50}$, the analysis result of the element concentration by the EDX method, and the evaluation results of the fluorescence characteristics are shown in Table 1 to Table 3.

Comparative Example 2

A β-sialon phosphor particle was obtained by the same raw materials and methods as in Example 3. As a result of powder X-ray diffraction measurement of the obtained β-sialon phosphor particle, the crystal phase present was a β-sialon single phase.

Further, the same analysis or evaluation as in Example 1 was performed. The compounding composition, $D_{v50}$, the analysis result of the element concentration by the EDX method, and the evaluation results of the fluorescence characteristics are shown in Table 1 to Table 3.

As shown in, for example, Table 2, even when the particle was produced by the same raw materials and methods as in. Comparative Example 1, the individual element concentrations on the surface portion and near the center of the particle were different from those in Comparative Example 1. This is assumed to be attributed to a slight production error.

TABLE 1

| | First compounding composition (% by mass) | | | | Second compounding composition (% by mass) | | | | | Composition | |
|---|---|---|---|---|---|---|---|---|---|---|---|
| | $Si_3N_4$ | AlN | $Al_2O_3$ | $Eu_2O_3$ | First fired powder | $Si_3N_4$ | AlN | $Al_2O_3$ | $Eu_2O_3$ | (% by mass) Eu | $D_{v50}$ (μm) |
| Example 1 | 95.80 | 2.74 | 0.56 | 0.90 | 90.00 | — | — | — | 10.00 | 0.72 | 19.1 |
| Example 2 | 95.80 | 2.74 | 0.56 | 0.90 | 90.00 | — | — | — | 10.00 | 0.72 | 19.3 |
| Example 3 | 95.80 | 2.74 | 0.56 | 0.90 | 95.00 | — | — | — | 5.00 | 0.67 | 19.2 |
| Example 4 | 95.80 | 2.74 | 0.56 | 0.90 | 95.00 | — | — | — | 5.00 | 0.67 | 19.8 |
| Comparative Example 1 | 95.80 | 2.74 | 0.56 | 0.90 | | | | | | 0.78 | 18.0 |
| Comparative Example 2 | 95.80 | 2.74 | 0.56 | 0.90 | | | | | | 0.78 | 17.5 |

TABLE 2

| | | N [at %] | O [at %] | Al [at %] | Si [at %] | Eu [at %] | Pc-Ps |
|---|---|---|---|---|---|---|---|
| Example 1 | Surface portion | 60.5 | 14.0 | 1.1 | 24.3 | 0.07 | 14.3 |
| | Near center | 55.1 | 4.2 | 2.0 | 38.6 | 0.09 | |
| Example 2 | Surface portion | 51.6 | 14.7 | 1.3 | 32.4 | 0.07 | 8.2 |
| | Near center | 55.1 | 2.4 | 1.9 | 40.6 | 0.06 | |
| Example 3 | Surface portion | 57.2 | 15.4 | 0.9 | 26.5 | 0.05 | 13.8 |
| | Near center | 54.2 | 3.5 | 1.9 | 40.3 | 0.10 | |
| Example 4 | Surface portion | 51.5 | 13.4 | 1.1 | 33.9 | 0.08 | 9.0 |
| | Near center | 53.8 | 2.0 | 1.3 | 42.8 | 0.08 | |
| Comparative Example 1 | Surface portion | 55.4 | 3.3 | 1.7 | 39.5 | 0.07 | −0.2 |
| | Near center | 55.9 | 3.1 | 1.7 | 39.3 | 0.03 | |
| Comparative Example 2 | Surface portion | 55.9 | 2.9 | 1.1 | 40.2 | 0.05 | 1.2 |
| | Near center | 54.8 | 2.2 | 1.6 | 41.4 | 0.08 | |

TABLE 3

| | Example 1 | Example 2 | Example 3 | Example 4 | Comparative Example 1 | Comparative Example 2 |
|---|---|---|---|---|---|---|
| Emission peak intensity (%) | 113 | 112 | 110 | 111 | 100 | 100 |
| Emission peak wavelength (nm) | 543 | 543 | 544 | 544 | 543 | 543 |

TABLE 3-continued

|  | Example 1 | Example 2 | Example 3 | Example 4 | Comparative Example 1 | Comparative Example 2 |
|---|---|---|---|---|---|---|
| Chromaticity x | 0.367 | 0.368 | 0.368 | 0.367 | 0.362 | 0.363 |
| Chromaticity y | 0.616 | 0.615 | 0.615 | 0.615 | 0.619 | 0.618 |

As shown in Table 3 and the like, the emission peak intensities of the β-sialon phosphor particles of Examples 1 to 4 in which the Pc–Ps value was 3 at % or more were larger than the emission peak intensities of the β-sialon phosphor particles of Comparative Examples 1 and 2 in which Pc and Ps were approximately the same values by 10% or more. That is, it was shown that luminance can be improved by the β-sialon phosphor particle having a Pc–Ps value of 3 at % or more.

This application claims priority on the basis of Japanese Patent Application No. 2019-150280 filed on Aug. 20, 2019, the entire disclosure of which is incorporated herein by reference.

REFERENCE SIGNS LIST 10 light emitting device
12 light emitting light source (LED chip)
23 first lead frame
13a upper portion
13b recess portion
14 second lead frame
15 wavelength conversion member
16 bonding wire
17 sealing resin
18 phosphor (β-sialon phosphor particle)
19 cap

The invention claimed is:

1. A europium-doped β-sialon phosphor particle, wherein, when an element concentration of a Si atom on a surface portion of the phosphor particle that is obtained by analyzing a cross section of the phosphor particle by an energy dispersive X-ray analysis method is indicated by Ps [at %], and an element concentration of a Si atom near a center of the phosphor particle that is obtained by an analysis by the same method is indicated by Pc [at %], a Pc-Ps value is 5 at % or more and 20 at % or less.

2. The β-sialon phosphor particle according to claim 1, wherein Ps is 20 at % or more and 35 at % or less.

3. The β-sialon phosphor particle according to claim 1, wherein a 50% diameter $D_{v50}$ in a cumulative volume in particle size distribution is 5 μm or more and 50 μm or less.

4. The β-sialon phosphor particle according to claim 1, wherein the β-sialon phosphor particle is represented by general formula $Si_{6-z}Al_zO_zN_{8-z}$: $Eu^{2+}$ ($0 < Z \leq 4.2$).

5. A light emitting device comprising:
a light emitting light source; and
a wavelength conversion member,
wherein the wavelength conversion member contains a phosphor, and
the phosphor contains the β-sialon phosphor particle according to claim 1.

6. The light emitting device according to claim 5, wherein the light emitting light source includes an LED chip that generates light having a wavelength of 300 nm or more and 500 nm or less.

7. The light emitting device according to claim 5, wherein the phosphor further contains a manganese-doped KSF-based phosphor.

* * * * *